Patented Jan. 16, 1923.

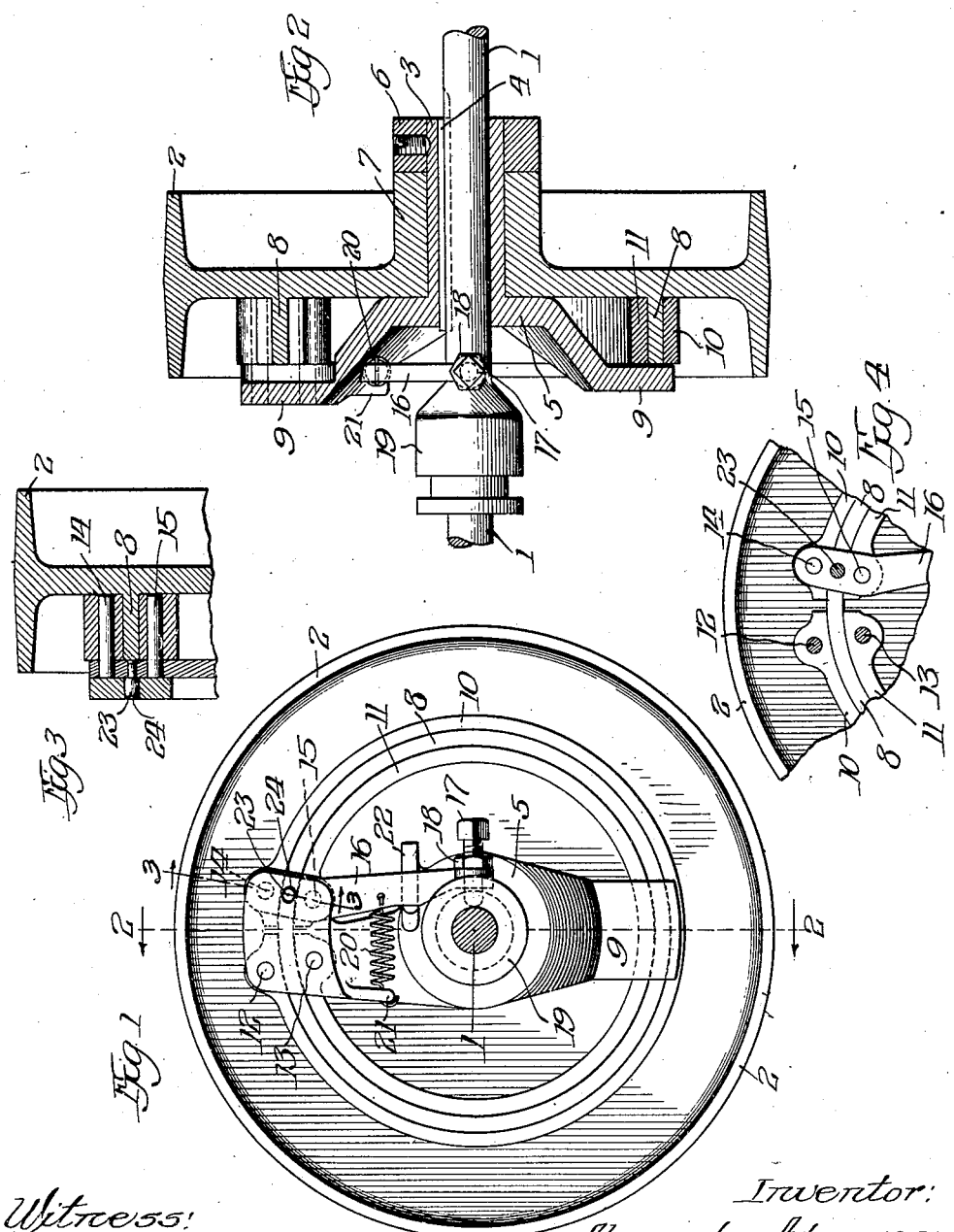

1,442,241

UNITED STATES PATENT OFFICE.

ALEXANDER ADAMSON, OF AKRON, OHIO.

CLUTCH.

Application filed February 19, 1921. Serial No. 446,257.

*To all whom it may concern:*

Be it known that I, ALEXANDER ADAMSON, a citizen of the United States, residing at Akron, in the county of Summit and State of Ohio, have invented certain new and useful Improvements in Clutches, of which the following is a specification.

The object of this invention is to improve upon existing clutch construction, particularly to provide a double frictional engagement of the clutch elements, which is accomplished by internal and external clamping bands operated simultaneously to establish driving connection between the two portions of the clutch.

Constructions which comprise inner and outer clamping bands have been devised heretofore, but so far as known to me, none have gone into actual use, and the purpose of the present invention is to simplify this type of clutch so as to make it a practicable and economical device. It is a further object of the invention to construct and design a clutch of this type which can be mounted on a shaft with little difficulty, so that it is adaptable for location on shafts, without special machining. A further object of the invention is to provide means which will prevent dragging of the clutch elements, whereby instantaneous release of the clutch is obtained.

These and other objects will be accomplished by the invention, it being understood that changes and modifications may be made in arrangement of the various parts and in details, within the scope of the invention.

In the drawings:

Fig. 1 is a front elevation of one form of the clutch mechanism.

Fig. 2 is a section through the clutch on the line 2—2 of Fig. 1.

Fig. 3 is a section of a portion of the clutch on the line 3—3 of Fig. 1.

Fig. 4 is a further detail showing the ends of the friction bands.

In the drawings 1 is the shaft and 2 is a pulley, these two elements forming the two parts of the clutch. Either one of these elements may be the driving member or the driven member, but for the sake of the present description the shaft 1 will be considered as the continuously operated driving member and the pulley 2 as the driven member which may be locked for driving engagement with the shaft. The shaft 1 carries a sleeve 3 to which it is connected by a feather or key, 4. The end of the sleeve is provided with a bearing plate 5 and on the other end of the sleeve is secured a collar 6. Between the plate and the collar is received for rotation the hub 7 of the pulley or driven member. The face or web of the pulley 2 on the side toward the plate 5 is provided with a concentric flange or rib 8, the extremities 9 of the plate 5 being offset from the central portion to pass over the rib 8. The annular rib 8 provides an inner and outer surface by means of which the parts 1 and 2 may be locked together.

Enclosing the rib 8 is an outer friction band 10 and an inner friction band 11, these parts standing slightly spaced from the rib 8 when the clutch is open or released. When it is desired to operate the clutch the outer band is contracted, and the inner band expanded so that the rib is gripped on both surfaces and a firm hold is obtained.

One end of the band 10 and one end of the band 11 are secured to the overhanging portion 9 of the plate 5 by pins 12 and 13, respectively. The other end of band 10 is provided with a pin 14 and the adjacent portion of band 11 with a pin 15, the ends of each band being slightly spaced apart as shown in Fig. 4. The pins 14 and 15 are received in the end of an operating lever 16 which lever extends toward the shaft 1, and at its free end is provided with a pin 17. This pin 17 is preferably arranged to be adjusted with respect to the lever, such adjustment being obtained as here shown, by screw threaded engagement between the parts, a lock nut 18 being mounted on the pin 17 to hold it in adjusted position.

It will be seen that if the lever 16 is rocked outwardly, the two bands will move toward the flange 8 and establish driving relation between the parts 1 and 2, and if it is desired to adjust the amount of friction between the rib and the bands, adjustment of the pin 17 is made. This constitutes a simple and effective means of obtaining equal but adjustable pressure on the two bands.

In order to move the lever as described, there is provided a sliding cone 19 on the shaft 1 the tapering or inclined portion of the cone underlying the end of the pin 17. The cone may be moved back and forth on the shaft in any well known manner. A spring 20 is attached at one end to the lever 16 and at the other end to a lug 21 on the plate 5, and serves to keep the end of the pin in contact with the cone. A ledge 22 on the plate guides the lever in its movement.

Means are provided to prevent drag of the clutch members to obtain a quick release of the clutch and these means are so arranged as to be simple in the extreme but operative for the purpose. On the lever 16 midway of the points 14 and 15 is secured a pin 23 which projects through a slightly elongated hole or slot 24 in the extension 9. In the operation of the band the pin 23 does not act and is not intended to act as a fulcrum for the lever, as each point 14 or 15 may be considered a fulcrum, but should the bands 10 and 11 drag or not operate freely to disengage with the flange 8, the pin will bear against the end of the slot and will then be a positive fulcrum about which the lever rocks and the bands will be positively contracted or expanded.

The operation of the clutch will be clearly understood from the description which has been given. When the cone 19 is out as shown in Fig. 2, the inner and outer bands are out of contact with the flange 8, and the parts 1 and 2 are not in driving relation. When however, the cone is moved inwardly along the shaft, the lever 16 is rocked to the right of Fig. 1, and the bands grip the flange on the inner and outer surfaces, the two parts thus being in driving relation. The pin 23 operates in the manner described to insure a quick positive release of the friction bands.

It will be seen that by providing a circular friction band about the entire inner and outer circumference of the flange 8, an effective clutch is provided not only due to the fact that a large area of contact is obtained, but also due to the fact that the rotation of the pulley serves always to increase the hold of the bands. Thus if the pulley is rotating counter-clockwise in Fig. 1 the rotation will serve to wind up the band 10 on the flange 8, if it is rotating clockwise then to unwind the inner band 11. In either case the arrangement is such that when the clutch is in engagement it will afford a tight grip between the parts.

Changes and modifications may be made in the device, and form and proportions are not essential but may be varied within the scope of the invention and within the limits of the claims appended hereto. The invention is not limited to use as a clutch, as it may be adapted for use in other relations.

I claim—

1. A clutch mechanism comprising a driving and a driven member, an annular rib formed on one of said members, a bearing plate on the other member, the bearing plate extending over the rib, two circular friction bands, said bands being each split at one point and secured at one side of the split, one outside of and one inside of the annular rib, a single lever pivoted to the said bands at the other side of the split, yielding means attached to the lever and tending to rock it to expand the outer band and contract the inner band, a pin in the free end of the lever and a sliding cone, the pin bearing upon the inclined surface of the cone.

2. A clutch mechanism comprising a driving member and a driven member, an annular rib formed on one of said members, split bands adjacent the inner and outer surfaces of the rib, a rocking lever pivoted to both said bands, a fulcrum on said lever normally inoperative as such but operative to form a positive fulcrum for the lever should its movement fail to operate the bands.

3. A clutch mechanism comprising a driving member and a driven member, an annular rib formed on one of said members, split bands adjacent the inner and outer surfaces of said rib, a bearing plate on the other of said members, said bands being anchored at one side of the split to the bearing plate, a rocking lever pivoted to the said bands on the other side of the split and a pin and slot connection between the lever and the bearing plate, said pin riding to the end of the slot should a band fail to operate upon release of the clutch.

4. A clutch mechanism comprising a driving and a driven member, an annular rib formed on one of said members, a bearing plate secured to the other member, the bearing plate extending over the rib, two split circular friction bands secured to the plate at one side of the split, one inside and one outside of the annular rib, a lever pivoted to the said bands at the other side of the split, yielding means tending to rock the lever to expand the outer band and contract the inner band, a pin and slot connection between the lever and the bearing plate, a sliding cone, the end of the lever bearing upon the inclined surface of the cone, said cone expanding the inner band and contacting the outer band, said pin riding to the end of the slot should a band fail to operate upon withdrawal of the cone.

ALEXANDER ADAMSON.